US012254858B2

(12) United States Patent
Park et al.

(10) Patent No.: US 12,254,858 B2
(45) Date of Patent: Mar. 18, 2025

(54) ACOUSTIC METAMATERIAL STRUCTURE

(71) Applicant: CENTER FOR ADVANCED META-MATERIALS, Daejeon (KR)

(72) Inventors: Jong Jin Park, Sejong-si (KR); Jae Hwa Lee, Daejeon (KR); Eun Bok, Seoul (KR); Hak Joo Lee, Daejeon (KR)

(73) Assignee: CENTER FOR ADVANCED META-MATERIALS, Daejeon (KR)

( * ) Notice: Subject to any disclaimer, the term of this patent is extended or adjusted under 35 U.S.C. 154(b) by 347 days.

(21) Appl. No.: 17/688,949

(22) Filed: Mar. 8, 2022

(65) Prior Publication Data

US 2022/0293076 A1 Sep. 15, 2022

(30) Foreign Application Priority Data

Mar. 11, 2021 (KR) ........................ 10-2021-0031978

(51) Int. Cl.
*G10K 11/162* (2006.01)
*G10K 11/16* (2006.01)

(52) U.S. Cl.
CPC .......... *G10K 11/162* (2013.01); *G10K 11/161* (2013.01)

(58) Field of Classification Search
USPC .......................................................... 181/229
See application file for complete search history.

(56) References Cited

U.S. PATENT DOCUMENTS 2,247,130 A * 6/1941 McCurdy ................ F01N 1/003 181/239
2,297,046 A * 9/1942 Bourne ..................... F01N 1/02 110/184
(Continued)

FOREIGN PATENT DOCUMENTS

KR 10-0835709 B1 6/2008
KR 10-2013-0053988 A 5/2013
(Continued)

OTHER PUBLICATIONS

Hedayati and Lakshmanan; Acoustic metamaterials based on Helmholtz resonators (Year: 2020).*
(Continued)

*Primary Examiner* — Forrest M Phillips
*Assistant Examiner* — Joseph James Peter Illicete
(74) *Attorney, Agent, or Firm* — Revolution IP, PLLC

(57) ABSTRACT

Disclosed herein is an acoustic metamaterial structure which can effectively reduce noise in a specific frequency range through formation of an acoustic bandgap, wherein the specific frequency range is determined by a periodic structure formed by an array of multiple unit cells. The acoustic metamaterial structure includes multiple first unit cells each including a first space having a first cross-sectional area and a second space disposed downstream of the first space in a flow direction of fluid to communicate with the first space, the second space having a second cross-sectional area larger than the first cross-sectional area, wherein the acoustic metamaterial structure reduces noise in a specific frequency range through formation of an acoustic bandgap, the specific frequency range being determined by a periodic structure formed by an array of the first space and the second space.

17 Claims, 6 Drawing Sheets

(56) References Cited

U.S. PATENT DOCUMENTS

| | | | | |
|---|---|---|---|---|
| 6,422,192 | B1 * | 7/2002 | Bloomer | F02M 35/1227 123/184.57 |
| 7,334,663 | B2 * | 2/2008 | Nakayama | F02M 35/1255 123/184.55 |
| 7,540,353 | B2 * | 6/2009 | Okawa | F02M 35/1266 123/184.57 |
| 7,845,466 | B2 * | 12/2010 | Kostun | F02M 35/10013 181/271 |
| 11,114,080 | B2 * | 9/2021 | Lee | G10K 11/172 |
| 2007/0044747 | A1 * | 3/2007 | Sawatari | F02M 35/1261 123/184.53 |
| 2015/0345497 | A1 * | 12/2015 | Lucas | F04B 39/0027 418/205 |

FOREIGN PATENT DOCUMENTS

| | | | |
|---|---|---|---|
| WO | 2018-094959 | A1 | 5/2018 |
| WO | 2020-036029 | A1 | 2/2020 |

OTHER PUBLICATIONS

Byung-Jin Kwon et al., "Wave Propagation Characteristics of Acoustic Metamaterials with Helmholtz Resonators", Transactions of the Korean Society for Noise and Vibration Engineering, vol. 23, Issue 2, pp. 167~175, 2013.

Office Action of Korean Patent Application No. 10-2021-0031978 mailed Mar. 20, 2023.

* cited by examiner (a)

(b)

(a)

(b)

ACOUSTIC METAMATERIAL STRUCTURE

FIELD

The present invention relates to an acoustic metamaterial structure and, more particularly, to an acoustic metamaterial structure which can effectively reduce noise in a specific frequency range through formation of an acoustic bandgap, wherein the specific frequency range is determined by a periodic structure formed by an array of multiple unit cells.

BACKGROUND

Acoustic metamaterials refer to artificial periodic structures which are formed of a metal or plastic material to have properties not found in nature so as to transmit, modulate, and absorb sound or ultrasonic waves at specific frequencies.

Such an acoustic metamaterial was first introduced through publication of a report suggesting the presence of a material having a negative value for both permittivity and permeability. Since then, there has been active research on an acoustic metamaterial structure using an artificial periodic structure having negative permittivity and permeability.

A noise reduction device using a sound-absorbing material has good performance in reducing high frequency noise. However, such a noise reduction device has problems of poor performance in reducing low frequency noise, dust emission from the sound-absorbing material, and poor durability due to vulnerability to moisture or heat stress.

Accordingly, active research is being conducted on noise reduction devices using metamaterial structures as described above. Particularly, a reflective noise reduction device has been widely used in recent years. Such a reflective noise reduction device reduces noise through reflection of sound waves using impedance mismatch caused by changes in geometric shape of a pipe. Examples of the reflective noise reduction device include models using an expansion pipe or a perforation pipe adapted to change the cross-sectional area of a pipe. However, since noise reduction performance of such models is directly related to the degree of change in cross-sectional area of the pipe, there is a problem of increase in device size or volume.

In a resonator-based noise reduction device, a resonator having a frequency that matches the frequency of noise generated in a flow pipe is installed on the flow pipe to reduce the noise. However, since the size of the resonator needs to be within a certain limit due to several design considerations such as a positional relation between different pipes and a relation with surrounding structures, the resonator-based noise reduction device has poor performance in reducing noise outside a target frequency range.

In general, removal of high frequency noise requires a resonator having a relatively small size and removal of high frequency noise requires a resonator having a relatively large size. However, since a flow pipe is generally installed in a narrow space, it is not easy to install a large-sized resonator, making it difficult to remove low frequency noise using the resonator-based noise reduction device. In addition, use of a large-sized resonator is far from a recent trend of pursuing reduction in device size.

RELATED LITERATURE

Patent Document (Patent Document 1) Korean Patent Registration No. 0835709 (Issue Date: 2008 Jun. 5)

SUMMARY

Embodiments of the present invention are conceived to solve such problems in the art and it is an aspect of the present invention to provide an acoustic metamaterial structure which can effectively reduce noise in a specific frequency range through formation of an acoustic bandgap, wherein the specific frequency range is determined by a periodic structure formed by multiple unit cells.

In accordance with one aspect of the present invention, there is provided an acoustic metamaterial structure including: multiple first unit cells each including a first space having a first cross-sectional area and a second space disposed downstream of the first space in a flow direction of fluid to communicate with the first space, the second space having a second cross-sectional area larger than the first cross-sectional area, wherein at least one of the multiple first unit cells communicates with a flow pipe through which the fluid flows, the multiple first unit cells are sequentially arranged in a longitudinal direction of the flow pipe, and the acoustic metamaterial structure reduces noise in a specific frequency range through formation of an acoustic bandgap, the specific frequency range being determined by a periodic structure formed by an array of the first space and the second space.

In accordance with another aspect of the present invention, there is provided an acoustic metamaterial structure including: multiple first unit cells each including a first space having a first cross-sectional area and a second space disposed downstream of the first space in a flow direction of fluid to communicate with the first space, the second space having a second cross-sectional area larger than the first cross-sectional area, wherein at least one of the multiple first unit cells communicates with a flow pipe through which the fluid flows, the multiple first unit cells are sequentially arranged in a spiral pattern surrounding a circumference of the flow pipe, and the acoustic metamaterial structure reduces noise in a specific frequency range through formation of an acoustic bandgap, the specific frequency range being determined by a periodic structure formed by an array of the first space and the second space.

In accordance with a further aspect of the present invention, there is provided an acoustic metamaterial structure including: multiple first unit cells each including a first space having a first cross-sectional area and a second space disposed downstream of the first space in a flow direction of fluid to communicate with the first space, the second space having a second cross-sectional area larger than the first cross-sectional area, wherein at least one of the multiple first unit cells communicates with a flow pipe through which the fluid flows, the multiple first unit cells are sequentially arranged in a direction crossing a longitudinal direction of the flow pipe to surround a circumference of the flow pipe, and the acoustic metamaterial structure reduces noise in a specific frequency range through formation of an acoustic bandgap, the specific frequency range being determined by a periodic structure formed by an array of the first space and the second space.

A ratio of the second cross-sectional area to the first cross-sectional area may exceed 2:1.

When an attenuation target frequency is relatively low, a ratio of the second cross-sectional area to the first cross-sectional area may be set to a relatively large value and, when the attenuation target frequency is relatively high, the ratio of the second cross-sectional area to the first cross-sectional area may be set to a relatively small value.

One of the multiple first spaces may include an inlet communicating with the flow pipe, wherein the fluid introduced into the first space through the inlet travels along the alternately arranged first and second spaces, is reflected by a most downstream second space, and travels back to the inlet.

One of the multiple first spaces may include an inlet communicating with the flow pipe, wherein the fluid introduced into the first space through the inlet circulates along the alternately arranged first and second spaces.

The acoustic metamaterial structure may further include: a neck extension member extending from the first space to protrude inwardly of the second space.

When the attenuation target frequency is relatively low, a length of the neck extension member may be set to a relatively large value and, when the attenuation target frequency is relatively high, the length of the neck extension member may be set to a relatively small value.

In accordance with yet another aspect of the present invention, there is provided an acoustic metamaterial structure including: a first unit cell group including multiple first unit cells each including a first space having a first cross-sectional area and a second space disposed downstream of the first space in a flow direction of fluid to communicate with the first space and having a second cross-sectional area larger than the first cross-sectional area, at least one of the multiple first unit cells communicating with a flow pipe through which the fluid flows; and a second unit cell group including multiple second unit cells each including a third space having a third cross-sectional area and a fourth space disposed downstream of the third space in the flow direction of the fluid to communicate with the third space and having a fourth cross-sectional area larger than the third cross-sectional area, at least one of the multiple second unit cells communicating with the flow pipe, wherein the first unit cell group and the second unit cell group are arranged with a space therebetween in a longitudinal direction of the flow pipe, a ratio of the second cross-sectional area to the first cross-sectional area is different from a ratio of the fourth cross-sectional area to the third cross-sectional area, and the acoustic metamaterial structure reduces noise in a first frequency range and noise in a second frequency range different from the first frequency range through formation of an acoustic bandgap, the first frequency range being determined by a periodic structure formed by the first unit cell group, and the second frequency range being determined by a periodic structure formed by the second unit cell group.

The acoustic metamaterial structure according to the present invention can effectively attenuate noise over a broad range of frequencies through formation of a wide acoustic bandgap using a periodic structure formed by an array of multiple unit cells.

According to the present invention, depending on the size and shape of a flow pipe requiring noise attenuation, the installation direction of the periodic structure formed by the array of the multiple unit cells can be appropriately varied among a direction parallel to a longitudinal direction of the flow pipe, a spiral direction with respect to the longitudinal direction of the flow pipe, and a direction crossing the longitudinal direction of the flow pipe, thereby allowing improvement in compatibility of the acoustic metamaterial structure and reduction in size and weight of a noise attenuation device including the acoustic metamaterial structure.

DRAWINGS

The above and other aspects, features, and advantages of the present invention will become apparent from the detailed description of the following embodiments in conjunction with the accompanying drawings.

DETAILED DESCRIPTION

Figure 1:
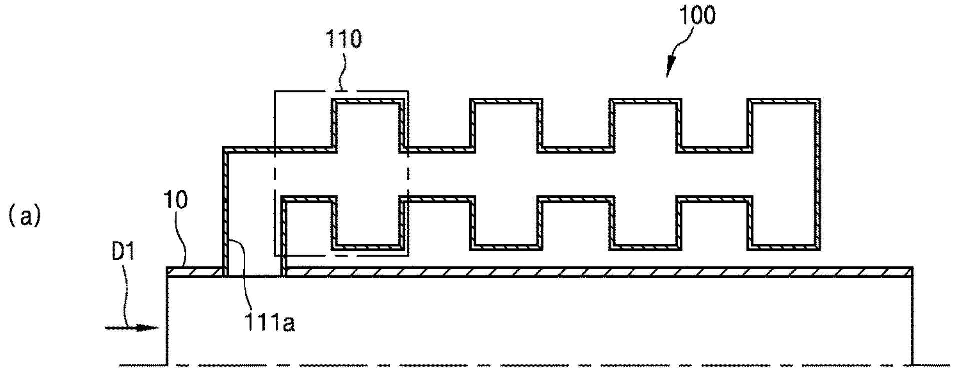
FIG. 1 is a schematic sectional view of an acoustic metamaterial structure according to a first embodiment of the present invention, wherein the acoustic metamaterial structure is installed on a flow pipe.
Figure 1:
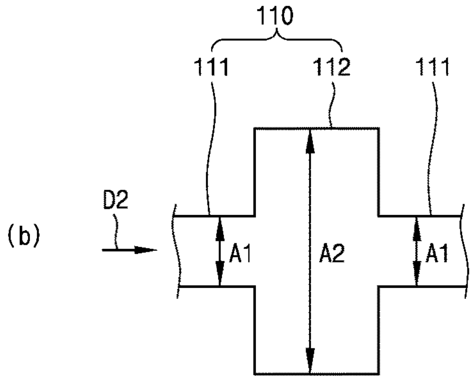

Hereinafter, preferred embodiments of the present invention will be described with reference to the accompanying drawings. In description of the embodiments, the same components will be denoted by the same terms and the same reference numerals and repeated description thereof will be omitted.

FIG. 1(*a*) is a schematic sectional view of an acoustic metamaterial structure according to a first embodiment of the present invention, wherein the acoustic metamaterial structure is installed on a flow pipe, and FIG. 1(*b*) is a partially enlarged view of the acoustic metamaterial structure of FIG. 1(*a*).

Referring to FIG. 1, the acoustic metamaterial structure according to the first embodiment may include a first unit cell group 100.

The first unit cell group 100 may include multiple first unit cells 110.

At least one of the multiple first unit cells 110 may communicate with a flow pipe 10 through which fluid flows, such that a portion of the fluid flowing through the flow pipe 10 can be introduced into the first unit cell group 100.

The multiple first unit cells 110 may be sequentially arranged in a longitudinal direction D1 of the flow pipe 10 through which fluid flows.

The first unit cell 110 provides a space for flow of the fluid and may have multiple spaces having different cross-sectional areas. The multiple spaces may be sequentially arranged in the longitudinal direction D1 of the flow pipe 10.

The frequency of the first unit cell group 100 may be set to a specific range depending on the type of periodic structure formed by the multiple spaces, that is, the arrangement pattern, shapes, and cross-sectional area ratio of the multiple spaces, such that noise in a frequency range corresponding to the preset frequency range can be reduced.

That is, the type of periodic structure formed by the first unit cell group 100, that is, the arrangement pattern, shapes, and cross-sectional area ratio of the multiple spaces, may be varied depending on the attenuation target frequency.

The first unit cell 110 according to this embodiment may include a first space 111 and a second space 112.

The first space 111 may have a first cross-sectional area A1 with respect to a flow direction D2 of the fluid.

In addition, the first space 111 may include an inlet 111*a* communicating with the flow pipe 10, whereby a portion of the fluid flowing through the flow pipe 10 can be introduced into the first space 111 through the inlet 111*a*.

The second space 112 may have a second cross-sectional area A2 with respect to the flow direction D2 of the fluid. Here, the second cross-sectional area A2 may be greater than the first cross-sectional area A1.

Preferably, the second cross-sectional area A2 is set to more than twice the first cross-sectional area A1. That is, a ratio of the second cross-sectional area A2 to the first cross-sectional area A1 may exceed 2:1.

In addition, the second space 112 may be disposed downstream of the first space 111 in the flow direction D2 of the fluid and may communicate with the first space 111.

The first space 111 and the second space 112 may be arranged in the longitudinal direction D1 of the flow pipe 10. That is, the flow direction of the fluid through the first space 111 and the second space 112 may be parallel to the longitudinal direction D1 of the flow pipe 10.

The first unit cell group 100 may have a periodic structure called a phononic crystal through a structure in which the first space 111 and the second space 112 having different cross-sectional areas are alternately arranged in the longitudinal direction D1 of the flow pipe 10.

When sound waves pass through the periodic structure formed by the first space 111 and the second space 112, the periodic structure interferes with propagation of sound waves in a specific frequency range, which is determined by the sizes, shapes, arrangement pattern, and cross-sectional area ratio of the first and second spaces. That is, whenever sound waves pass through two adjacent spaces having different cross-sectional areas, an acoustic bandgap is formed. In addition, multiple acoustic bandgaps formed while sound waves pass through the multiple first unit cells 110 can be merged into a wider acoustic bandgap.

As compared with an acoustic metamaterial structure in which multiple first unit cells are disposed independently of one another instead of communicating with one another, the acoustic metamaterial structure according to the present invention, in which the multiple first unit cells 110 communicating with one another are periodically arranged, can block sound waves in a relatively wide frequency range due to merging of acoustic bandgaps, which occurs when sound waves pass through each of the spaces.

The cross-sectional areas of the first space 110 and the second space 120 may be appropriately adjusted depending on the attenuation target noise frequency.

Specifically, the ratio of the second cross-sectional area A2 to the first cross-sectional area A1 according to this embodiment may be adjusted according to the attenuation target noise frequency.

Equation 1 is the Helmholtz frequency (f) calculation formula, where c is the speed of a sound wave, A is the area of a neck (orifice) of a Helmholtz resonator, L is the length of the neck, and V is the volume of a resonance chamber.

$$f = \frac{c}{2\pi}\sqrt{\frac{A}{VL}} \qquad \text{Equation 1}$$

Increase in ratio of the second cross-sectional area A2 to the first cross-sectional area A1 may correspond to decrease in area A of the neck of the Helmholtz resonator or increase in volume V of the resonance chamber. Thus, according to the Helmholtz frequency (f) calculation formula, the attenuation target noise frequency is set relatively low, thereby allowing effective attenuation of noise in a relatively low frequency range.

Conversely, decrease in ratio of the second cross-sectional area A2 to the first cross-sectional area A1 may correspond to increase in area A of the neck of the Helmholtz resonator or decrease in volume V of the resonance chamber. Thus, according to the Helmholtz frequency (f) calculation formula, the attenuation target noise frequency is set relatively high, thereby allowing effective attenuation of noise in a relatively high frequency range.

Although each of the first unit cells 110 constituting the first unit cell group 100 has the same second cross-sectional area A2-to-first cross-sectional area A1 ratio in this embodiment, it should be understood that the present invention is not limited thereto and each of the first unit cells 110 constituting the first unit cell group 100 may have a different second cross-sectional area A2-to-first cross-sectional area A1 ratio. When the ratio of the second cross-sectional area A2 to the first cross-sectional area A1 is set differently among the multiple first unit cells arranged in the flow direction D2 of the fluid, a different target frequency range can be set for each of the first unit cells, thereby allowing noise attenuation over a broader range of frequencies.

Figure 2:
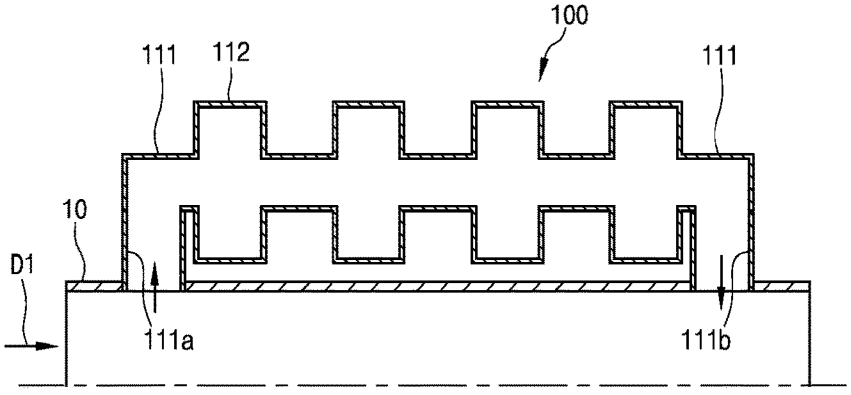
FIG. 2 is a schematic sectional view of a modification of the acoustic metamaterial structure according to the first embodiment.

FIG. 2 is a schematic sectional view of a modification of the acoustic metamaterial structure according to the first embodiment.

First, referring to FIG. 1(*a*), among the multiple first spaces 111, a most upstream first space 111 with respect to the flow direction D2 may include the inlet 111*a*. In this structure, the fluid introduced into the first space 111 through the inlet 111*a* travels along the alternately arranged first space 111 and second space 112, is reflected by a most downstream second space 112 with respect to the flow direction D2, travels in the reverse direction along the first space 111 and the second space 112, and is discharged to the flow pipe 10 through the inlet 111*a*. As a result, impedance mismatch may occur in a region at the inlet 111*a* with respect to the longitudinal direction D1 of the flow pipe 10 due to sound waves transmitted and reflected while passing through the first unit cell group 100.

Referring to FIG. 2, among the multiple first spaces 111, a most upstream first space 111 with respect to the flow direction D2 may include an inlet 111*a* and a most downstream first space 111 with respect to the flow direction D2 may include an outlet 111*b*. In this structure, the fluid introduced into the first space 111 through the inlet 111*a* is discharged to the flow pipe 10 through the outlet 111*b* after traveling along the alternately arranged first space 111 and second space 112. As a result, impedance mismatch may occur both in a region at the inlet 111*a* and a region at the outlet 111*b* with respect to the longitudinal direction D1 of the flow pipe 10 due to sound waves transmitted and reflected while passing through the first unit cell group 100.

As such, the communication location and structure between the first unit cell group 100 and the flow pipe 10 may be appropriately changed depending on the attenuation target noise frequency.

Figure 3:
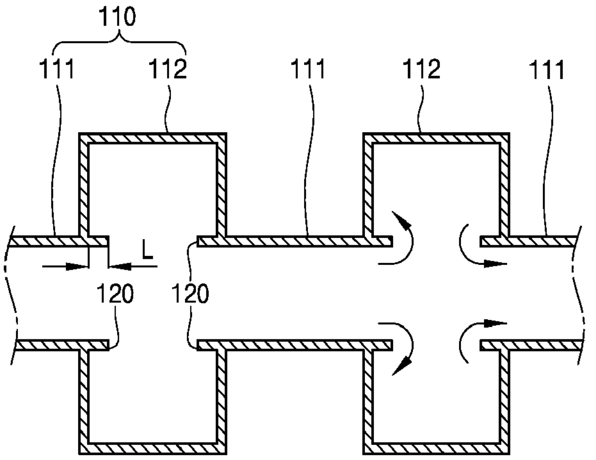
FIG. 3 is a schematic sectional view of another modification of the acoustic metamaterial structure according to the first embodiment.

FIG. 3 is a schematic sectional view of another modification of the acoustic metamaterial structure according to the first embodiment.

Referring to FIG. 3, the first unit cell group 100 according to this embodiment may further include a neck extension member 120.

The neck extension member 120 may be disposed at a joint between the first space 111 and the second space 112 and may extend from the first space 111 to protrude inwardly of the second space 112.

The neck extension member 120 may extend in the flow direction D2 while having a cross-sectional area equal to the first cross-sectional area A1 of the first space 111.

The neck extension member 120 serves to increase a flow path of the fluid passing through the first space 111, thereby allowing the fluid to flow a longer distance before entering the second space 112 adjacent to the first space 111.

According to the Helmholtz frequency (f) calculation formula, providing the neck extension member 120 may correspond to increase in length L (see Equation 1) of the neck, which corresponds to the first space 111, or increase in volume V (see Equation 1) of the resonance chamber, which corresponds to the second space 112. Accordingly, the neck extension member 120 allows effective attenuation of noise in a relatively low frequency range compared with the first unit cell group 100 without the neck extension member 120.

In addition, since there is no need to consider design changes related to the actual size and shape of the acoustic metamaterial structure to provide the neck extension member 120, it is possible to scale down the acoustic metamaterial structure. Further, given the same size, the acoustic metamaterial structure provided with the neck extension member 120 can attenuate a broader range of frequencies than the acoustic metamaterial structure without the neck extension member 120.

In addition, a length L to which the neck extension member 120 protrudes inwardly of the second space 112 may be adjusted depending on the attenuation target noise frequency.

Increase in length L of the neck extension member 120 may correspond to increase in length L (see Equation 1) of the neck of the Helmholtz resonator or increase in volume V (see Equation 1) of the resonance chamber, and thus allows the attenuation target noise frequency to be set relatively low, thereby allowing effective attenuation of noise in a relatively low frequency range.

Conversely, decrease in length L of the neck extension member 120 may correspond to decrease in length L (see Equation 1) of the neck of the Helmholtz resonator or decrease in volume V (see Equation 1) of the resonance chamber, and thus allows the attenuation target noise frequency to be set relatively high, thereby allowing effective attenuation of noise in a relatively high frequency range.

Figure 4:
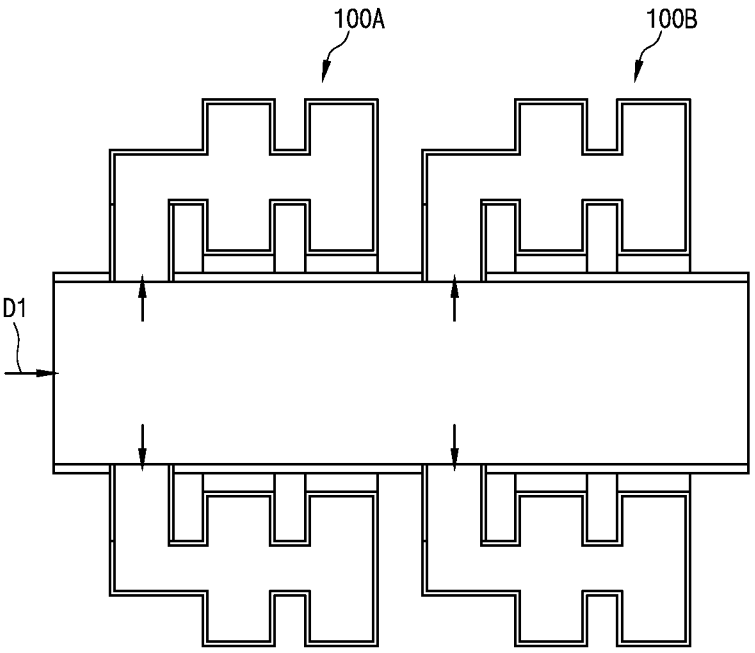
FIG. 4 is a schematic sectional view of a further modification of the acoustic metamaterial structure according to the first embodiment.
Figure 5:
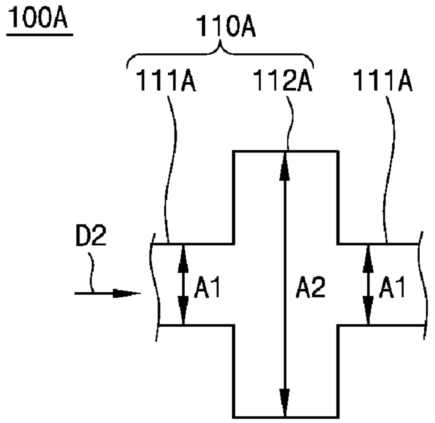
FIG. 5 shows a sectional view (a) taken along line A-A of FIG. 4 and a sectional view (b) taken along line B-B of FIG. 4.
Figure 5:
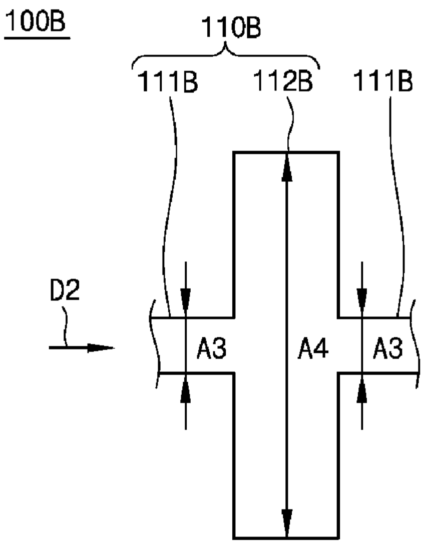

FIG. 4 is a schematic sectional view of a further modification of the acoustic metamaterial structure according to the first embodiment. FIG. 5(*a*) is a sectional view taken along line A-A of FIG. 4 and FIG. 5(*b*) is a sectional view taken along line B-B of FIG. 4.

Referring to FIG. 4, the acoustic metamaterial structure according to this embodiment may include multiple unit cell groups in the longitudinal direction of the flow pipe 10. That is, according to this embodiment, noise flowing through the flow pipe 10 can be effectively attenuated by arranging multiple unit cell groups along the length of the flow pipe 10 which requires noise attenuation.

Specifically, the acoustic metamaterial structure according to this embodiment may include a first unit cell group 100A and a second unit cell group 100B arranged with a space therebetween in the longitudinal direction D1 of the flow pipe 10.

The first unit cell group 100A and the second unit cell group 100B may have the same structure as the first unit cell group 100 described above and thus repeated description thereof will be omitted.

However, each of the first unit cell group 100A and the second unit cell group 100B according to this embodiment may form a different periodic structure. That is, a cross-sectional area ratio between a pair of adjacent spaces of the first unit cell group 100A may be different from that of the second unit cell group 100B.

Referring to FIG. 5, the first unit cell group 100A includes multiple first unit cells 110A each including a first space 111A having a first cross-sectional area A1 and a second space 112A communicating with the first space 111A and having a second cross-sectional area A2 greater than the first cross-sectional area A1.

The second unit cell group 100B includes multiple second unit cells 110B each including a third space 111B having a third cross-sectional area A3 and a fourth space 112B communicating with the third space 111B and having a fourth cross-sectional area A4 greater than the third cross-sectional area A3.

Here, a ratio of the second cross-sectional area A2 to the first cross-sectional area A1 may be different from a ratio of the fourth cross-sectional area A4 to the third cross-sectional area A3.

Since the first unit cell group 100A and the second unit cell group 100B form different periodic structures, the first unit cell group 100A may target noise in a first frequency range and the second unit cell group 100B may target noise in a second frequency range different from the first frequency range.

As a result, noise in the first and second frequency ranges, which are different from each other, can be reduced through formation of an acoustic bandgap, thereby allowing noise attenuation over a broader range of frequencies.

Figure 6:
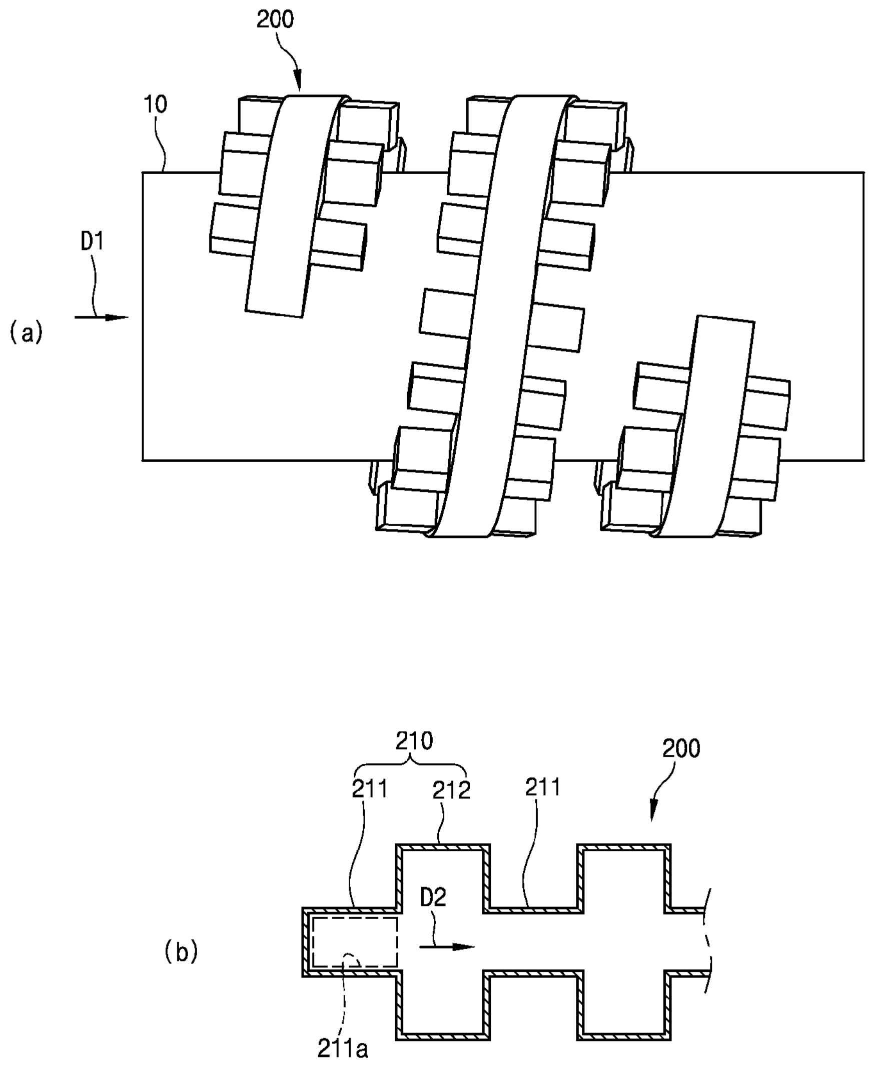
FIG. 6 is a side view of an acoustic metamaterial structure according to a second embodiment of the present invention, wherein the acoustic metamaterial structure is installed on a flow pipe.

FIG. 6(*a*) is a schematic side view of an acoustic metamaterial structure according to a second embodiment of the present invention, wherein the acoustic metamaterial structure is installed on a flow pipe, and FIG. 6(*b*) is a partially enlarged sectional view of the acoustic metamaterial structure of FIG. 6(*a*), wherein the acoustic metamaterial structure is in an unwrapped state.

Referring to FIG. 6, the acoustic metamaterial structure according to this embodiment includes a first unit cell group 200 including multiple first unit cells 210, like the acoustic metamaterial structure described above.

The first unit cell 210 according to this embodiment may have the same structure as the first unit cell 110 described above and thus repeated description thereof will be omitted.

However, the first unit cell group 200 according to this embodiment differs from the first unit cell group 100 described above in that the multiple first unit cells 210 are sequentially arranged in a spiral pattern surrounding a circumference of the flow pipe 10.

That is, when the fluid passes through the first unit cell group 200, the fluid may flow in a spiral direction D2 with respect to the longitudinal direction D1 of the flow pipe 10. As such, the first unit cell group 200 according to the second embodiment can attenuate noise in a different frequency range than the first unit cell group 100 according to the first embodiment just by setting the fluid flow direction D2 through the acoustic metamaterial structure differently from the fluid flow direction D1 through the flow pipe 10.

In addition, the quantity, helical angle, pitch, and length of the first unit cell group 200 forming the spiral acoustic metamaterial structure may be appropriately adjusted depending on the length of the flow pipe 10 and the attenuation target noise frequency.

For example, when the attenuation target frequency is relatively low, the pitch of the spiral acoustic metamaterial structure may be set to a relatively small value, whereas, when the attenuation target frequency is relatively high, the pitch of the spiral acoustic metamaterial structure may be set to a relatively large value.

Although the flow pipe 10 is shown as having a circular cross-section in FIG. 6, it should be understood that the present invention is not limited thereto and the flow pipe may have a polygonal cross-section, for example, a rectangular cross-section.

Figure 7:
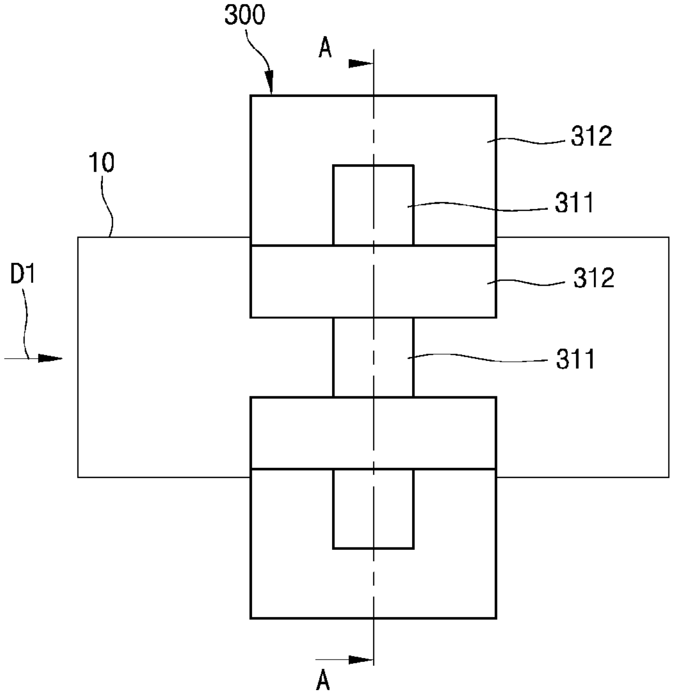
FIG. 7 is a schematic sectional view of an acoustic metamaterial structure according to a third embodiment of the present invention, wherein the acoustic metamaterial structure is installed on a flow pipe.
Figure 7:
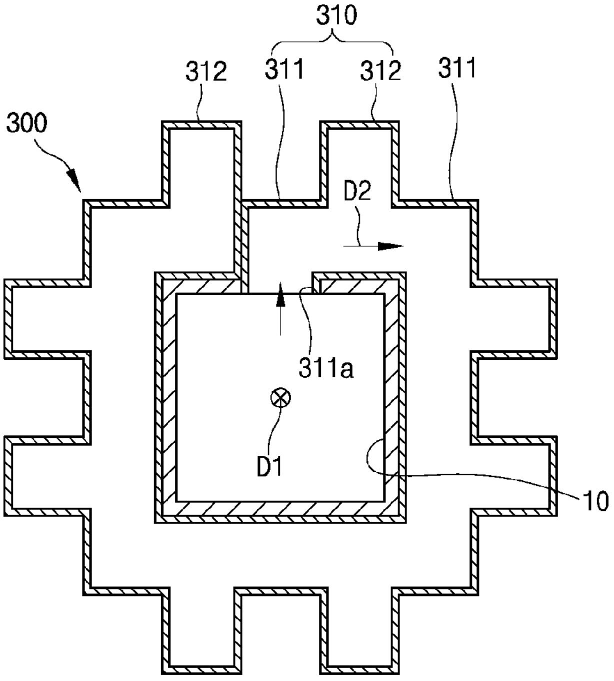

FIG. 7(*a*) is a schematic side view of an acoustic metamaterial structure according to a third embodiment of the present invention, wherein the acoustic metamaterial structure is installed on a flow pipe, and FIG. 7(*b*) is a sectional view taken along line A-A of FIG. 7(*a*).

Referring to FIG. 7, the acoustic metamaterial structure according to this embodiment includes a first unit cell group 300 including multiple first unit cells 310, like the acoustic metamaterial structure described above.

The first unit cell 310 according to this embodiment may have the same structure as the first unit cells 110, 210 described above, and thus repeated description thereof will be omitted.

However, the first unit cell group 300 according to this embodiment differs from the first unit cell groups described above in that the multiple first unit cells 310 are sequentially arranged in a direction crossing the longitudinal direction D1 of the flow pipe 10 to surround a circumference of the flow pipe 10.

That is, when the fluid passes through the first unit cell group 300, the fluid may flow in a direction crossing the longitudinal direction D1 of the flow pipe 10. As such, the first unit cell group 300 according to the third embodiment can attenuate noise in a different frequency range than the first unit cell groups 100, 200 according to the first and second embodiments just by setting the fluid flow direction D2 through the acoustic metamaterial structure differently from the fluid flow direction through the flow pipe 10.

In addition, the number of first unit cells 310 forming the acoustic metamaterial structure according to this embodiment may be appropriately adjusted depending on the length of the flow pipe 10 and the attenuation target noise frequency.

Although the flow pipe 10 is shown as having a rectangular cross-section in FIG. 7, it should be understood that the present invention is not limited thereto and the flow pipe 10 may have a circular cross-section or other polygonal cross-sections.

Further, according to this embodiment, it is possible to further reduce the size of the acoustic metamaterial structure with respect to the longitudinal direction D1 of the flow pipe 10 since the first unit cells of the first unit cell group 300 are arranged in a direction orthogonally crossing the longitudinal direction D1 of the flow pipe 10.

Figure 8:
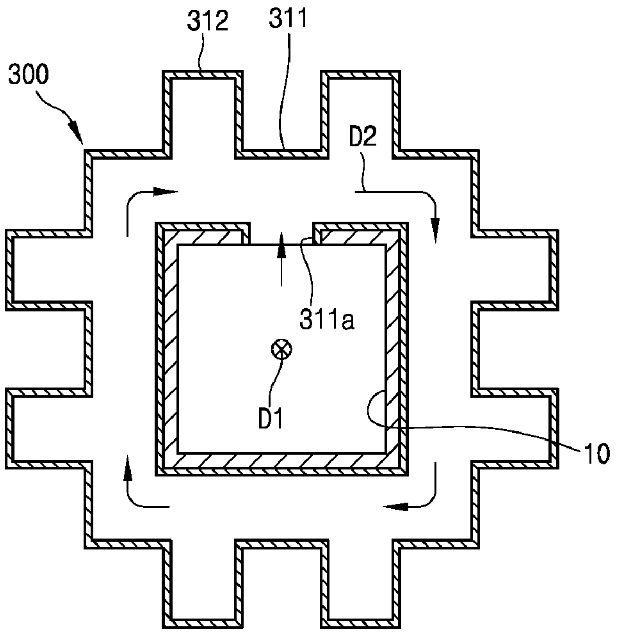
FIG. 8 is a schematic sectional view of a modification of the acoustic metamaterial structure according to the third embodiment.

FIG. 8 is a sectional view of a modification of the acoustic metamaterial structure according to the third embodiment.

First, referring to FIG. 7(*b*), among multiple first spaces 311, a most upstream first space 311 with respect to the flow direction D2 may include an inlet 311*a*. In this structure, the fluid introduced into the first space 311 through the inlet 311*a* travels along the alternately arranged first and second spaces 311, 312, is reflected by a most downstream second space 312 with respect to the flow direction D2, travels in the reverse direction along the first and second spaces 311, 312, and is discharged to the flow pipe 10 through the inlet 311*a*.

Referring to FIG. 8, the unit cell group 300 according to this embodiment may be disposed in an annular pattern to completely surround the circumference of the flow pipe 10, wherein a most upstream first space 311 with respect to the fluid flow direction D2 may communicate with a most downstream second space 312 with respect to the fluid flow direction D2.

That is, among the multiple first spaces 311, the most upstream first space 311 with respect to the flow direction D2 may include an inlet 311*a*, such that the most downstream second space 312 can communicate with the first space 311 including the inlet 311*a*. Accordingly, the fluid introduced through the inlet 311*a* can continue to circulate along the alternately arranged first space 311 and second space 312. In this way, the acoustic metamaterial structure according to this embodiment can allow formation and merging of acoustic bandgaps at an equivalent level to an infinite periodic structure and thus can form a wider acoustic bandgap, thereby blocking sound waves over a broader range of frequencies.

As described above, the acoustic metamaterial structure according to the present invention can form a wide acoustic bandgap through a periodic structure formed by an array of multiple unit cells, thereby achieving effective attenuation of noise over a broad range of frequencies.

In addition, since the installation direction of the periodic structure formed by the array of the multiple unit cells can be appropriately changed among a direction parallel to the longitudinal direction of a flow pipe 10 requiring noise attenuation, a spiral direction with respect to the longitudinal direction of the flow pipe, and a direction crossing the longitudinal direction of the flow pipe depending on the size and shape of the flow pipe, it is possible to improve compatibility of the acoustic metamaterial structure and to reduce the size and weight of a noise attenuation device including the acoustic metamaterial structure.

Although exemplary embodiments have been described herein, it should be understood that these embodiments are provided for illustration only and are not to be construed in any way as limiting the present invention, and that various modifications, changes, or alterations can be made by those skilled in the art without departing from the spirit and scope of the invention.

LIST OF REFERENCE NUMERALS

10: Flow pipe
100, 200, 300: First unit cell group
110, 210, 310: First unit cell
111, 211, 311: First space
112, 212, 312: Second space
111*a*, 211*a*, 311*a*: inlet
111*b*: outlet

The invention claimed is:

1. An acoustic metamaterial structure comprising:

multiple first unit cells each comprising a first space having a first cross-sectional area and a second space disposed downstream of the first space in a flow direction of fluid to communicate with the first space, the second space having a second cross-sectional area larger than the first cross-sectional area, wherein at least one of the multiple first unit cells communicates with a flow pipe through which the fluid flows, the multiple first unit cells are sequentially arranged in a longitudinal direction of the flow pipe, and the acoustic metamaterial structure reduces noise in a specific frequency range through formation of an acoustic bandgap, the specific frequency range being determined by a periodic structure formed by an array of the first space and the second space; and a neck extension member extending from the first space to protrude inwardly of the second space, wherein the first space has a shape bent at a 90-degree angle, with one end connected to the flow pipe and the other end connected to the second space.

2. An acoustic metamaterial structure comprising:

multiple first unit cells each comprising a first space having a first cross-sectional area and a second space disposed downstream of the first space in a flow direction of fluid to communicate with the first space, the second space having a second cross-sectional area larger than the first cross-sectional area, wherein at least one of the multiple first unit cells communicates with a flow pipe through which the fluid flows, the multiple first unit cells are sequentially arranged in a spiral pattern surrounding a circumference of the flow pipe, and the acoustic metamaterial structure reduces noise in a specific frequency range through formation of an acoustic bandgap, the specific frequency range being determined by a periodic structure formed by an array of the first space and the second space; and a neck extension member extending from the first space to protrude inwardly of the second space, wherein the first space has a shape bent at a 90-degree angle, with one end connected to the flow pipe and the other end connected to the second space.

3. An acoustic metamaterial structure comprising:

multiple first unit cells each comprising a first space having a first cross-sectional area and a second space disposed downstream of the first space in a flow direction of fluid to communicate with the first space, the second space having a second cross-sectional area larger than the first cross-sectional area, wherein at least one of the multiple first unit cells communicates with a flow pipe through which the fluid flows, the multiple first unit cells are sequentially arranged in a direction crossing a longitudinal direction of the flow pipe to surround a circumference of the flow pipe, and the acoustic metamaterial structure reduces noise in a specific frequency range through formation of an acoustic bandgap, the specific frequency range being determined by a periodic structure formed by an array of the first space and the second space; and a neck extension member extending from the first space to protrude inwardly of the second space, wherein the first space has a shape bent at a 90-degree angle, with one end connected to the flow pipe and the other end connected to the second space.

4. The acoustic metamaterial structure according to claim 1, wherein a ratio of the second cross-sectional area to the first cross-sectional area exceeds 2:1.

5. The acoustic metamaterial structure according to claim 2, wherein a ratio of the second cross-sectional area to the first cross-sectional area exceeds 2:1.

6. The acoustic metamaterial structure according to claim 3, wherein a ratio of the second cross-sectional area to the first cross-sectional area exceeds 2:1.

7. The acoustic metamaterial structure according to claim 1, wherein, when an attenuation target frequency is relatively low, a ratio of the second cross-sectional area to the first cross-sectional area is set to a relatively large value and, when the attenuation target frequency is relatively high, the ratio of the second cross-sectional area to the first cross-sectional area is set to a relatively small value.

8. The acoustic metamaterial structure according to claim 2, wherein, when an attenuation target frequency is relatively low, a ratio of the second cross-sectional area to the first cross-sectional area is set to a relatively large value and, when the attenuation target frequency is relatively high, the ratio of the second cross-sectional area to the first cross-sectional area is set to a relatively small value.

9. The acoustic metamaterial structure according to claim 3, wherein, when an attenuation target frequency is relatively low, a ratio of the second cross-sectional area to the first cross-sectional area is set to a relatively large value and, when the attenuation target frequency is relatively high, the ratio of the second cross-sectional area to the first cross-sectional area is set to a relatively small value.

10. The acoustic metamaterial structure according to claim 1, wherein one of the first spaces of the multiple first unit cells comprises an inlet communicating with the flow pipe and the fluid introduced into the first space through the inlet travels along the alternately arranged first and second spaces, is reflected by a most downstream second space, and travels back to the inlet.

11. The acoustic metamaterial structure according to claim 2, wherein one of the first spaces of the multiple first unit cells comprises an inlet communicating with the flow pipe and the fluid introduced into the first space through the inlet travels along the alternately arranged first and second spaces, is reflected by a most downstream second space, and travels back to the inlet.

12. The acoustic metamaterial structure according to claim 3, wherein one of the first spaces of the multiple first unit cells comprises an inlet communicating with the flow pipe and the fluid introduced into the first space through the inlet travels along the alternately arranged first and second spaces, is reflected by a most downstream second space, and travels back to the inlet.

13. The acoustic metamaterial structure according to claim 3, wherein one of the multiple first spaces comprises an inlet communicating with the flow pipe and the fluid introduced into the first space through the inlet circulates along the alternately arranged first and second spaces.

14. The acoustic metamaterial structure according to claim 1, wherein, when an attenuation target frequency is relatively low, a length of the neck extension member is set to a relatively large value and, when the attenuation target frequency is relatively high, the length of the neck extension member is set to a relatively small value.

15. The acoustic metamaterial structure according to claim 2, wherein, when an attenuation target frequency is relatively low, a length of the neck extension member is set to a relatively large value and, when the attenuation target frequency is relatively high, the length of the neck extension member is set to a relatively small value.

16. The acoustic metamaterial structure according to claim 3, wherein, when an attenuation target frequency is relatively low, a length of the neck extension member is set to a relatively large value and, when the attenuation target frequency is relatively high, the length of the neck extension member is set to a relatively small value.

17. An acoustic metamaterial structure comprising:

a first unit cell group comprising multiple first unit cells each comprising a first space having a first cross-sectional area and a second space disposed downstream of the first space in a flow direction of fluid to communicate with the first space and having a second cross-sectional area larger than the first cross-sectional area, at least one of the multiple first unit cells communicating with a flow pipe through which the fluid flows; and a second unit cell group comprising multiple second unit cells each comprising a third space having a third cross-sectional area and a fourth space disposed downstream of the third space in the flow direction of the fluid to communicate with the third space and having a fourth cross-sectional area larger than the third cross-sectional area, at least one of the multiple second unit cells communicating with the flow pipe, wherein the first unit cell group and the second unit cell group are arranged with a space therebetween in a longitudinal direction of the flow pipe, a ratio of the second cross-sectional area to the first cross-sectional area is different from a ratio of the fourth cross-sectional area to the third cross-sectional area, and the acoustic metamaterial structure reduces noise in a first frequency range and noise in a second frequency range different from the first frequency range through formation of an acoustic bandgap, the first frequency range being determined by a periodic structure formed by the first unit cell group, and the second frequency range being determined by a periodic structure formed by the second unit cell group, wherein the first space has a first shape bent at a 90-degree angle, with one end connected to the flow pipe and the other end connected to the second space, wherein the third space has a second shape bent at the 90-degree angle, with one end connected to the flow pipe and the other end connected to the fourth space.

* * * * *